United States Patent [19]

Tomioka et al.

[11] Patent Number: 5,741,386
[45] Date of Patent: Apr. 21, 1998

[54] APPARATUS AND METHOD FOR SQUEEZE-GLUING DECORATIONS

[75] Inventors: Masanori Tomioka, Hoi-gun; Kiyoshi Matsuura, Toyokawashi; Hitoshi Yamashita, Toyokawa; Tomohisa Nakamura, Gamagohri, all of Japan

[73] Assignee: Sintokogio, Ltd., Nagoya, Japan

[21] Appl. No.: 685,455

[22] Filed: Jul. 19, 1996

[30] Foreign Application Priority Data

Jul. 21, 1995 [JP] Japan ................................ 7-207584

[51] Int. Cl.$^6$ ........................................ B32B 31/00
[52] U.S. Cl. .................... 156/212; 156/245; 156/500; 156/580
[58] Field of Search ........................... 156/212, 245, 156/500, 580, 581, 583.1

[56] References Cited

U.S. PATENT DOCUMENTS

| | | | |
|---|---|---|---|
| 4,802,948 | 2/1989 | Zimmermann et al. | 156/500 |
| 5,076,880 | 12/1991 | Spengler et al. | 156/382 |
| 5,324,384 | 6/1994 | Spengler | 156/581 |
| 5,326,417 | 7/1994 | Phelps | 156/267 |

*Primary Examiner*—James Sells
*Attorney, Agent, or Firm*—Limbach & Limbach L.L.P.

[57] ABSTRACT

A method and apparatus is provided for squeeze-gluing a decoration onto a cast, which method consists of putting lower peripheral surfaces of a decoration, the upper surfaces of which decoration are treated with glue, and a cast, over the decoration so as to have a peripheral part of the cast be held, gluing outer parts of the decoration onto parts of the cast corresponding thereto, pressing inner parts of the decoration against parts of the cast corresponding thereto so as to glue the inner parts to the corresponding parts of the cast, and simultaneously with the pressing step, squeezing a peripheral part of the decoration into a squeezing groove in the cast.

4 Claims, 2 Drawing Sheets

APPARATUS AND METHOD FOR SQUEEZE-GLUING DECORATIONS

TECHNICAL FIELD

This invention relates to a method and apparatus for gluing a decoration onto an uneven surface of a cast, and squeezing the peripheral part of the decoration into a groove in the cast.

BACKGROUND OF THE INVENTION

In a conventional method of applying a trim, for example, to the door of a car, there have been some drawbacks when a decoration is glued onto an uneven cast or when the peripheral part thereof is squeezed into a groove in the cast. This is because there were difficulties in setting or holding a decoration onto the uneven surface, and because the decoration tends to move when pressed in the direction defined by recesses on a cast so that it cannot be made to form a given shape. This invention has been made by considering these problems. The purpose of this invention is to provide an apparatus and method wherein a decoration can be easily set onto and held on a cast without any shift towards one side of the cast, so that adequate squeeze-gluing can be realized.

SUMMARY OF THE INVENTION

The above-mentioned purpose can be achieved by the method and apparatus of this invention. The method comprises putting lower peripheral surfaces of a glued decoration on a lower mold, placing a cast over the decoration so as to be able to first glue outer parts of the decoration onto parts of the cast corresponding thereto, then pressing inner parts of the decoration against parts of the cast corresponding thereto so as to glue the inner parts of the decoration to the corresponding parts of the cast, and simultaneously with the pressing step, squeezing a peripheral part of the decoration into a squeezing groove in the cast. The apparatus is characterized by a lower inner mold 2 and a lower outer mold 6, disposed on a lower base plate 1, a squeezing blade 8 disposed along an outer peripheral side of the outer mold 6, a receiving coil 12 disposed above the lower base plate 1, an upper mold 13, disposed above the lower base plate 1, the lower surfaces of which mold correspond in position to the upper surfaces of the lower inner mold 2, the lower outer mold 6, and the squeezing blade 8, a member 14 for holding down the cast 16, which is disposed above the lower base plate 1, so that the member 14 corresponds in position to a receiving mold 12, an upper base plate 15, on which the upper mold 13 and the hold-down member 14 are mounted so as to be suspended from the plate 15, disposed movably up and down relative to the lower base plate 1, first coil springs 4, disposed along an outer peripheral side of the lower inner mold 2, for resiliently supporting the lower outer mold 6 so that the distance between the upper surface of the lower mold 6 and the lower surface of the corresponding portion of the cast 16 is less than the distance between the upper surface of the lower inner mold 2 and the lower surface of the corresponding portions of the cast 16, and second coil springs 10, disposed along an outer peripheral side of the squeezing blade 8, for supporting a receiving mold 12 for the cast 16 so as to hold an upper surface of the receiving mold 12.

By adopting the above-mentioned means this invention operates as follows. Initially the peripheral part of a decoration, whose upper surface (the back) is treated with glue, is placed on the lower mold. A cast is then disposed above the decoration, whereupon the upper mold is moved downward. It first comes in contact with the upper surface of the cast 16. Along with a further downward movement, the upper mold 13 and the lower outer mold 6 squeeze the cast and the decoration 18. Thus, first the peripheral part of the decoration is made to adhere to the cast due to compression by the lower outer mold and upper mold, second, the entire decoration is pressed against the cast and made to adhere to it by the upper mold and lower inner mold while the peripheral part of the decoration and the cast are being held therebetween, and third, the peripheral part of the decoration is squeezed into the groove in the cast by the squeezing blade.

EMBODIMENTS

Figure 1:
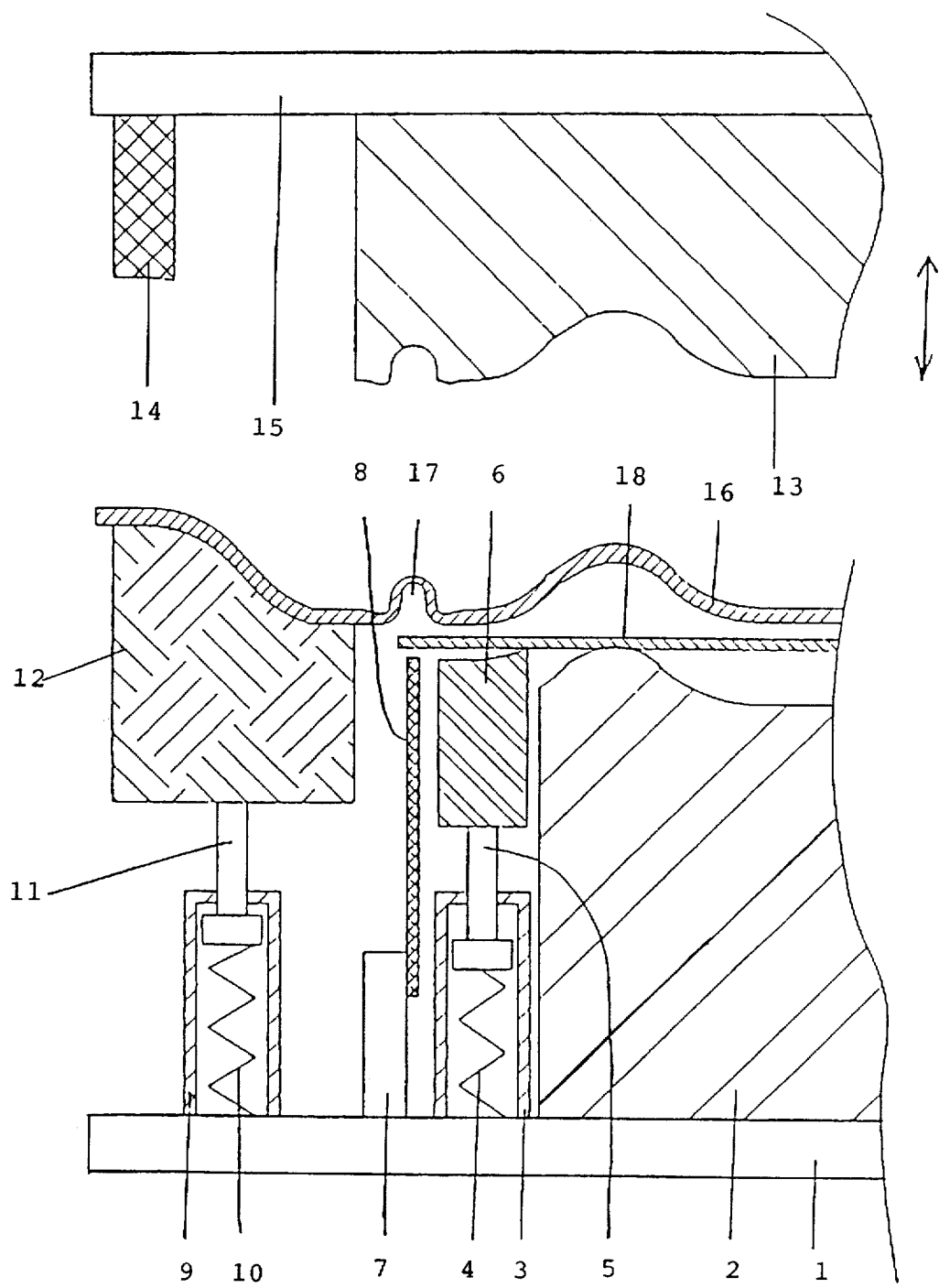
FIG. 1 is a sectional front view of an embodiment of this invention showing the state where the upper and lower molds are spaced apart and a part of the decoration is about to be glued to the corresponding part of a cast.

An embodiment of this invention will now be explained in detail. A lower inner mold 2, having uneven surfaces or concave and convex surfaces corresponding to the configuration of a cast to be treated, is fixed on the central part of a lower base plate 1. A plurality of guide cylinders 3 are vertically disposed on the lower base plate 1, with a proper interval therebetween (not shown) along the peripheral side of the lower inner mold 2. Coil springs 4 are inserted in the insides of the guide cylinders 3. On the upper side of each of the first coil springs 4 a first piston rod 5 is floatingly disposed such that the rod 5 slides freely through the cylinder 3 with the bottom end of the rod 5 abutting the spring 4. An annular lower outer mold 6 is disposed on the upper ends of the first piston rods 5 so that it surrounds the peripheral side of the lower inner mold 2. The outer mold 6 is urged upwards such that, when the upper base plate 15 is lowered, the outer mold part first engages the counterpart of an upper mold 13 as detailed below. In other words, the outer mold 6 is slightly raised relative to the inner mold 2 so that the distance between the upper surface of the lower outer mold 6 and the lower surface of the corresponding portion of the cast 16 is less than the distance between the upper surface of the lower mold 2 and the lower surface of the corresponding portion of the cast 16, and so that the outer mold 6 can first hold and glue the periphery of the decoration 18. An annular squeezing blade 8 extends upwardly to a proper height, supported by a mount 7 along the peripheral side of the lower outer mold 6 on the lower base plate 1.

Along the peripheral side of the squeezing blade 8 on the lower base plate 1, a plurality of second guide cylinders 9 are vertically disposed with a proper interval therebetween (not shown). Second coil springs 10 are inserted in the insides of the guide cylinders 9. On the upper part of each of the second coil springs 10 a second piston rod 11 is floatingly disposed such that the rod 11 slides freely through the cylinder 9 with the bottom end of the rod 11 abutting the spring 10. An annular receiving mold 12 is disposed on the upper ends of the second piston rods 11 so that it surrounds the periphery of the squeezing blade 8. An upper base plate 15 is disposed movably up and down above the lower surface plate 1. On the lower surface of the upper base plate 15 are mounted an upper mold 13, its position corresponding to the lower inner mold 2, a lower outer mold 6, and a squeezing blade 8, the upper surfaces of these members being complementary with the lower surface of the upper mold 13, and a hold-down member 14 for a cast, its position corresponding to the receiving mold 12. The distance between the upper surface of the receiving mold 12 and the lower surface of the member 14 is less than the distance between the upper surface of the lower outer mold 6 and the upper lower surface of the corresponding part of the upper mold 13.

Figure 2:
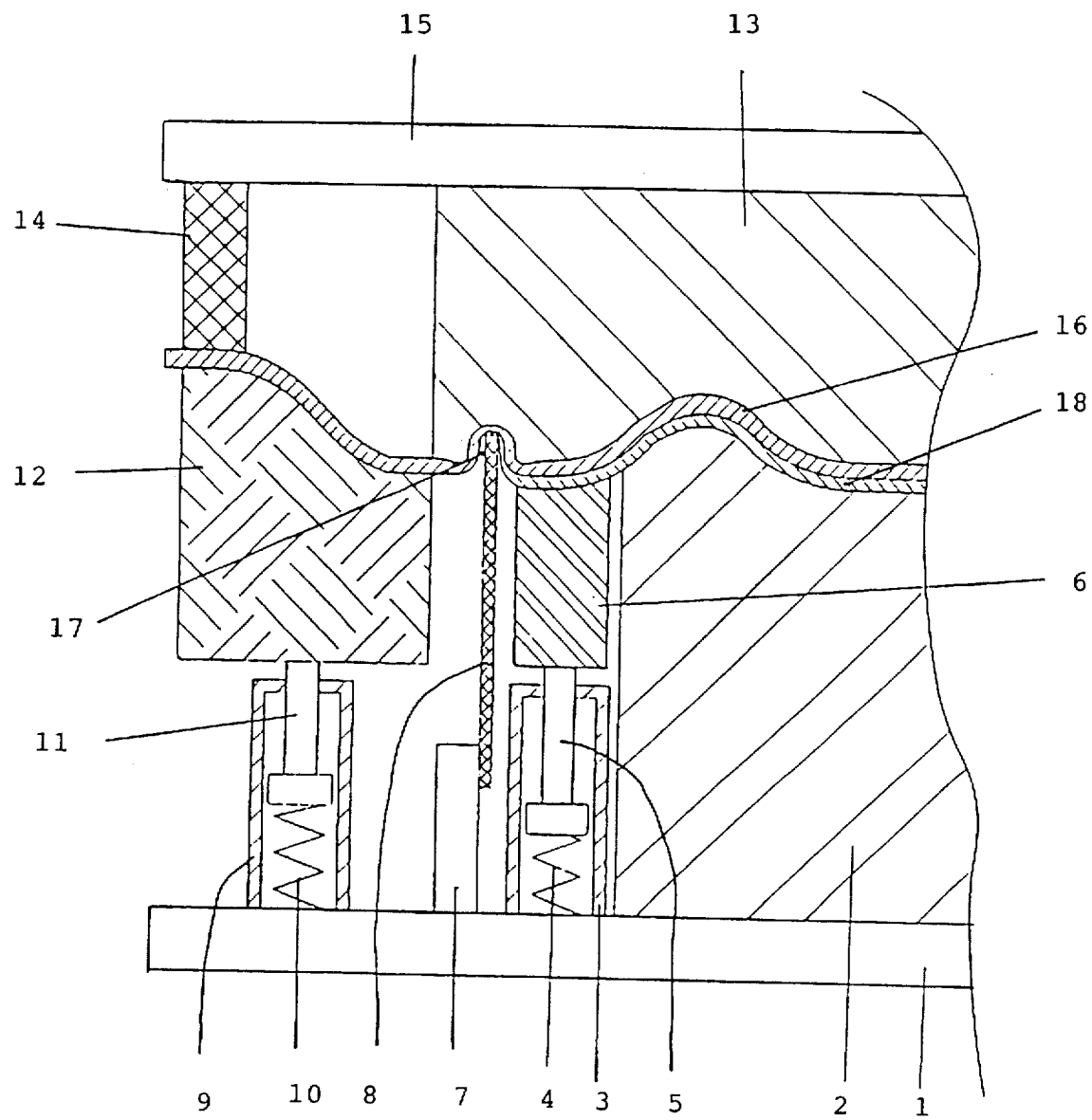
FIG. 2 is a sectional front view of the embodiment showing the state where the decoration has been glued to the cast.

FIG. 1 shows a state of the thus-constituted structure wherein the decoration 18, on the upper surface (the back) of which an adhesive is applied, is put on the upper part of the lower mold (the peripheral part of the decoration 18 is supported on the lower outer mold 6 and the lower inner mold 2), and then the cast 16 is disposed on the upper part of the decoration 18 and the annular receiving mold 12. Next, the upper surface plate 15 is moved down. The hold-down member 14 goes down against the force of the coil springs 10 until the peripheral part of the cast 16 is being held between the member 14 and mold 12. Then the cast 16 and the peripheral part of the decoration 18 go down against the force of the coil spring 4 while those parts are being held between the upper mold 13 and lower outer mold 6 so as to be glued. After that the cast 16 and the remaining part of the decoration 18 are glued by the engagement of the upper mold 13 and lower inner mold 2, and, simultaneously with the engagement, the squeezing blade 8 is squeezed into the squeezing groove 17 of the cast 16 to achieve squeeze-gluing, resulting in a state in FIG. 2, where the downward movement of the base plate 15 is stopped.

In the above-mentioned last step, since each of the peripheral parts of the decoration 18 is held between the upper mold 13 and lower inner mold 2 to be glued, the engagement of the cast, decoration and molds causes no movement of the decoration towards one side of the cast. The completed cast 16, on which the decoration 18 has been squeeze-glued, is taken out after the upper base plate 15 is moved up.

As can be seen from the above-mentioned descriptions, since this invention is structured so that the peripheral part of the decoration that is first treated with glue is held between the molds at a given position, and next the remaining part of the decoration is squeeze-glued onto the cast, it has excellent effects in that despite the uneven surfaces of the cast, the decoration can be squeeze-glued at a given position without deviating towards one side.

What is claimed is:

1. A method of squeeze-gluing a glued decoration onto a cast comprising putting lower peripheral surfaces of the glued decoration on a lower mold, placing the cast over the decoration and gluing outer parts of the decoration onto parts of the cast corresponding thereto, after gluing the outer parts of the decoration to the parts of the cast corresponding to said outer parts of the decoration, pressing inner parts of the decoration against parts of the cast corresponding thereto so as to glue the inner parts to the corresponding parts of the cast, and simultaneously with the pressing step squeezing a peripheral part of the decoration into a squeezing groove in the cast.

2. An apparatus for squeeze-gluing a decoration onto a cast, said apparatus comprising:

a lower inner mold and a lower outer mold, disposed on a lower base plate, a squeezing blade disposed along an outer peripheral side of the lower outer mold, a receiving mold disposed above the lower base plate, an upper mold, disposed above the lower base plate, the upper mold having a lower surface corresponding in position to upper surfaces of the lower inner mold, the lower outer mold, and the squeezing blade, a member for holding down a cast when a portion of the cast is positioned between the receiving mold and said member, wherein the member is disposed above the lower base plate so that the member corresponds in position to the receiving mold, an upper base plate, on which the upper mold and the member are mounted so as to be suspended from the upper base plate, wherein the upper base plate is mounted movably with respect to the lower base plate such that the upper base plate, the upper mold and the member are movable together as a unit up and down relative to the lower base plate, first coil springs, disposed along an outer peripheral side of the lower inner mold, for resiliently supporting the lower outer mold so that the distance between the upper surface of the lower outer mold and a lower surface of a corresponding portion of the cast is less than the distance between the upper surface of the lower inner mold and the lower surface of a corresponding portion of the cast, and second coil springs, disposed along an outer peripheral side of the squeezing blade, for resiliently supporting the receiving mold for the cast 16 so as to hold an upper as the upper base plate moves the member and the portion of the cast, when said portion of the cast is positioned between the member and the receiving plate, downward against the receiving mold.

3. The apparatus of claim 2, wherein the second coiled springs are disposed such that the distance between an upper surface of the receiving mold and the lower surface of the member is less than the distance between the upper surface of the lower outer mold and the lower surface of the corresponding portion of the upper mold.

4. A method of squeeze-gluing a glued decoration onto a cast, comprising:

(a) putting the glued decoration on a lower mold, with a lower surface of the glued decoration resting at least partially on the lower mold;

(b) placing the cast over the decoration, holding down an outer peripheral part of the cast against a receiving mold, and gluing an outer part of the decoration onto an outer part of the cast;

(c) after gluing the outer part of the decoration onto the outer part of the cast, but while continuing to hold down the outer peripheral part of the cast against the receiving mold, pressing an inner part of the cast against an inner part of the decoration so as to glue said inner part of the decoration onto said inner part of the cast; and (d) simultaneously with step (c), squeezing a peripheral part of the decoration into a squeezing groove in the cast.

* * * * *